United States Patent
McCready

(10) Patent No.: US 11,873,103 B1
(45) Date of Patent: Jan. 16, 2024

(54) ATTACHABLE ARMREST

(71) Applicant: Aaron J. McCready, Truckee, CA (US)

(72) Inventor: Aaron J. McCready, Truckee, CA (US)

(*) Notice: Subject to any disclaimer, the term of this patent is extended or adjusted under 35 U.S.C. 154(b) by 186 days.

(21) Appl. No.: 17/151,209

(22) Filed: Jan. 17, 2021

Related U.S. Application Data

(60) Provisional application No. 63/013,481, filed on Apr. 21, 2020.

(51) Int. Cl.
  *B64D 11/06* (2006.01)
  *B33Y 80/00* (2015.01)

(52) U.S. Cl.
  CPC ...... *B64D 11/0644* (2014.12); *B64D 11/0638* (2014.12); *B33Y 80/00* (2014.12)

(58) Field of Classification Search
  CPC .................. B64D 11/0638; B64D 11/0644
  USPC .................................................. 297/411.23
  See application file for complete search history.

(56) References Cited

U.S. PATENT DOCUMENTS

| | | | | |
|---|---|---|---|---|
| 7,431,396 B1* | 10/2008 | Dasso | ............... | A47C 7/546 297/411.23 |
| 8,201,889 B2* | 6/2012 | Miranda Montalvo | .. | 297/411.45 |
| 9,623,776 B2* | 4/2017 | Colsky | ............... | B64D 11/0644 |
| 2009/0315381 A1* | 12/2009 | Longnecker | ............ | 297/411.23 |
| 2012/0181837 A1* | 7/2012 | Meador | ................ | A47C 7/546 297/411.23 |

* cited by examiner

*Primary Examiner* — Anthony D Barfield
(74) *Attorney, Agent, or Firm* — Adibi IP Group, PC; Amir V. Adibi; Andrew C. Palmer

(57) ABSTRACT

An attachable armrest is provided that releasably attaches to an armrest of a vehicle. The attachable armrest includes a vertical support having first and second legs that straddle the armrest of the vehicle. The attachable armrest also includes an upper platform that connects to the vertical support. The upper platform provides an armrest surface that is substantially parallel with a top surface of the armrest of the vehicle. The armrest surface and the top surface are simultaneously usable as armrests by vehicle passengers.

20 Claims, 12 Drawing Sheets

PERSPECTIVE VIEW SHOWING HOW ATTACHABLE ARMREST ATTACHES TO EXISTING ARMREST OF VEHICLE SEAT

PERSPECTIVE VIEW OF ATTACHABLE ARMREST (OPEN CONFIGURATION)

PERSPECTIVE VIEW OF ATTACHABLE ARMREST (CLOSED CONFIGURATION)

PERSPECTIVE EXPLODED VIEW OF
ATTACHABLE ARMREST

PERSPECTIVE EXPLODED VIEW OF
ATTACHABLE ARMREST

TOP VIEW OF ATTACHABLE ARMREST
ATTACHED TO EXISTING VEHICLE ARMREST

SIDE VIEW OF ATTACHABLE ARMREST
ATTACHED TO VEHICLE ARMREST

BOTTOM VIEW OF ATTACHABLE ARMREST
IN CLOSED CONFIGURATION

END VIEW OF ATTACHABLE ARMREST
ATTACHED TO VEHICLE ARMREST

METHOD OF USING AN ATTACHABLE ARMREST

LAP TRAY DEVICE
1412
1502
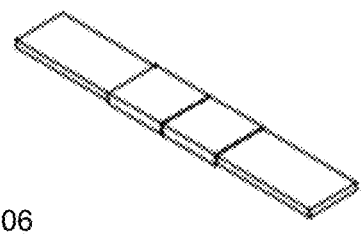
1504
OPEN/IN-USE VIEWS
1506
CLOSED/STORAGE VIEWS
<TOP VIEW>
 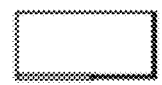
<FRONT VIEW>
 
<BOTTOM VIEW>
 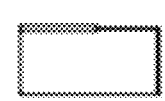
FIG. 15

ATTACHABLE ARMREST

CROSS REFERENCE TO RELATED APPLICATIONS

This application claims the benefit under 35 U.S.C. § 119 from U.S. Provisional Patent Application Ser. No. 63/013,481, entitled "Attachable Armrest," filed on Apr. 21, 2020, the subject matter of which is incorporated herein by reference.

TECHNICAL FIELD

The present invention relates generally to vehicle armrests, and more specifically, to a portable attachable armrest for use with armrests installed on commercial transportation vehicles.

BACKGROUND INFORMATION

In commercial vehicles used for mass transportation, such as airliners and trains, a number of passenger seats are typically provided in a side-by-side configuration. Between two adjacent seats, an armrest is provided. The armrest accommodates passenger arms and elbows. The armrest provides a more comfortable traveling experience by allowing passengers to sit more comfortably and relax until they reach their destination.

SUMMARY

In various exemplary embodiments, a portable attachable armrest is provided that overcomes the problems associated with armrests installed on commercial vehicles. In one embodiment, the attachable armrest is a portable device that a passenger can carry onto a commercial vehicle, such as a plane or train. The attachable armrest is placed on top of the existing vehicle armrest. The attachable armrest provides an upper platform that allows two people seated in adjacent seats to utilize both the upper platform and existing vehicle armrest simultaneously. Before and after the trip, the attachable armrest folds flat for easy storage and transportation.

In an embodiment, an attachable armrest is provided that comprises a vertical support having first and second legs that straddle the armrest of the vehicle. The attachable armrest also includes an upper platform that connects to the vertical support. The upper platform provides an armrest surface that is substantially parallel with a top surface of the armrest of the vehicle. The armrest surface and the top surface are simultaneously usable as armrests by vehicle passengers. The attachable armrest is manufactured through a computer numerical control (CNC) machining process, an injection molding process, a 3D (three-dimensional) printing process, or any other suitable manufacturing process.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 15 is a diagram showing a detailed embodiment of the lap tray device shown in FIG. 14.

DETAILED DESCRIPTION

Reference will now be made in detail to some embodiments of the invention, examples of which are illustrated in the accompanying drawings.

Figure 1:
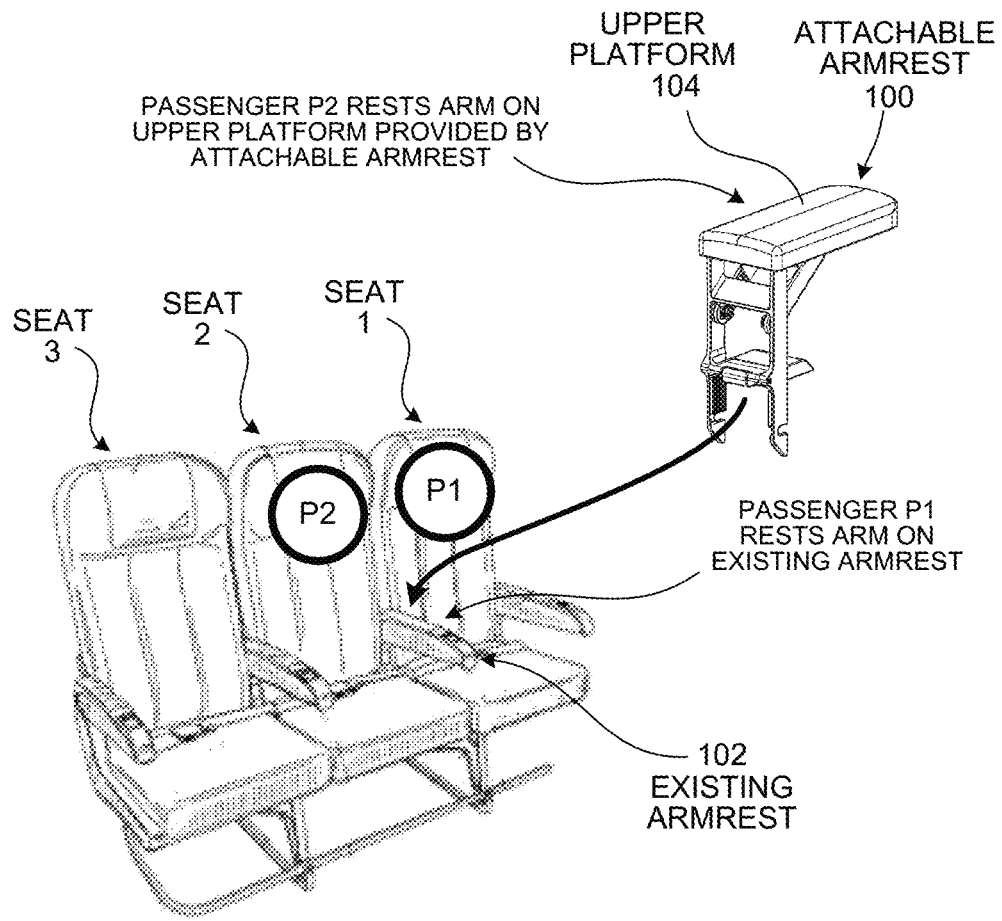
FIG. 1 is a diagram showing a perspective view of an attachable armrest that attaches to a vehicle armrest.

FIG. 1 is a diagram showing a perspective view of an attachable armrest 100 that attaches to a vehicle armrest. As illustrated in FIG. 1, a mass transit vehicle, such as an airplane, includes a seat configuration having three adjacent seats (1-3). Armrests are provided between the seats, such as existing armrest 102. Two passengers (P1 and P2) seated in adjacent seats are meant to share the existing armrest 102. However, the armrest 102 may be too narrow to be used by both passengers (P1 and P2) simultaneously.

The attachable armrest 100 is a portable accessory device that can be attached (or mounted) to the existing armrest 102. The attachable armrest 100 provides an upper platform 104, which one of the passengers may use while the other passenger uses the existing armrest 102. The attachable armrest 100 is configured to have an appropriate width so that when it is mounted to an existing armrest, the available seat space is not reduced. When leaving the vehicle, the attachable armrest 100 folds into a small footprint for easy storage and carry.

Figure 2:
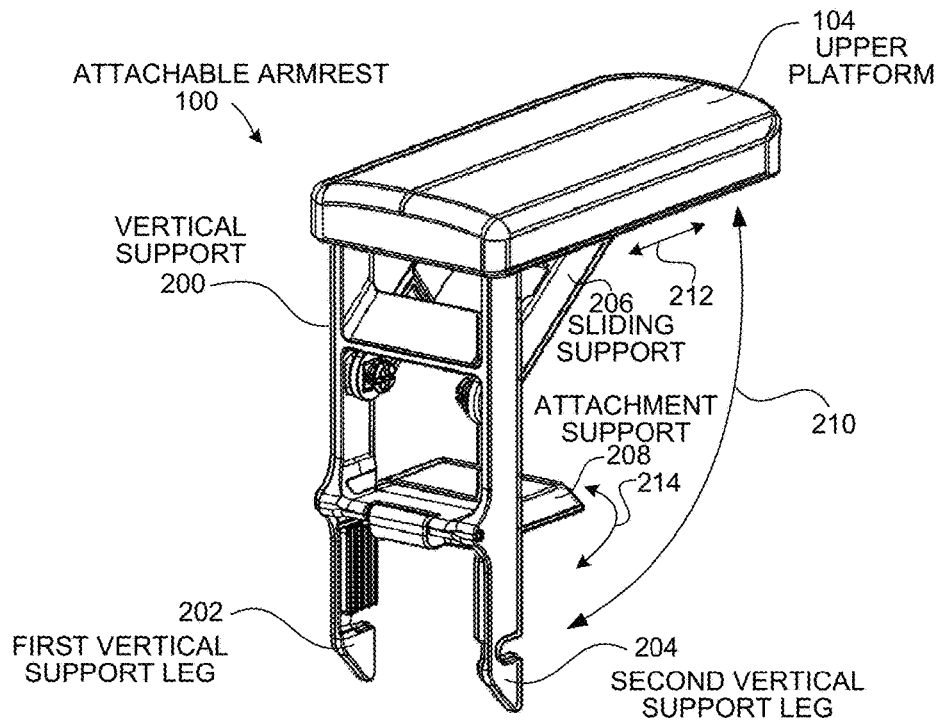
FIG. 2 is a diagram showing a perspective view of an attachable armrest in an open configuration.

FIG. 2 is a diagram showing a perspective view of the attachable armrest 100 in an open configuration. As illustrated in FIG. 2, the attachable armrest 100 comprises the upper platform 104, a vertical support structure 200, a sliding support 206, and an attachment support 208. The vertical support structure 200 includes a first vertical support leg 202 and a second vertical support leg 204.

The attachable armrest 100 is shown in an open configuration that is obtained when the vertical support legs (202, 204) are rotated away from the upper platform 104 along path 210. A top portion of the sliding support 206 slides back and forth along the upper platform 104 in the direction 212 and the attachment support 208 rotates in the direction 214.

In this open configuration, the attachable armrest 100 can be attached to an existing vehicle armrest.

The attachable armrest 100 can be placed in a closed configuration by rotating the vertical support legs (202, 204) toward the upper platform 104 along path 210. This causes the sliding support 206 to slide along path 212 and fold in underneath the upper platform 104. The attachment support 208 rotates along path 214 to align with the vertical support 200.

Figure 3:
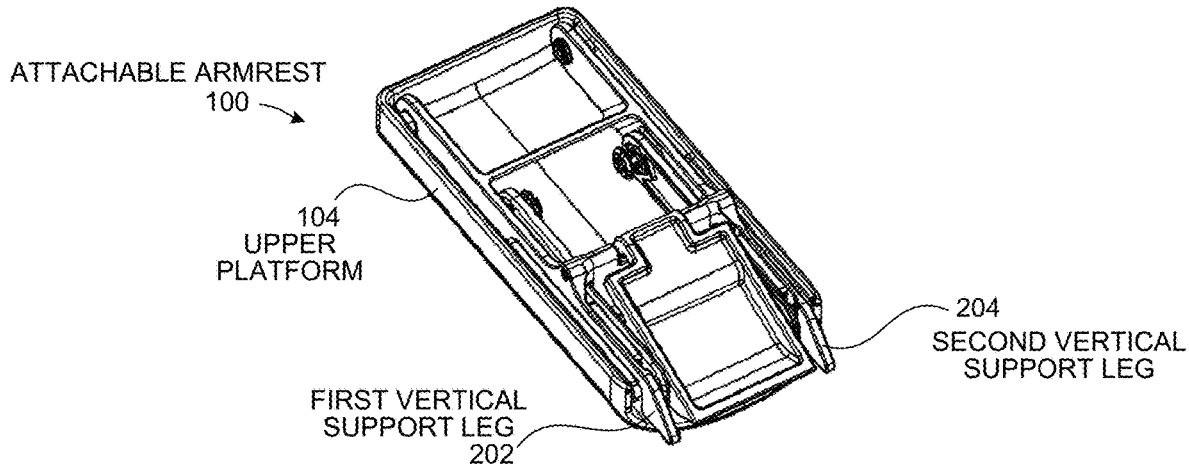
FIG. 3 is a perspective view of an attachable armrest in a closed configuration.

FIG. 3 is a perspective view of the attachable armrest 100 in a closed configuration. FIG. 3 illustrates a bottom perspective view that shows how the vertical support legs (202, 204) are rotated to fold within the upper platform 104 to place the attachable armrest 100 into the closed configuration. In this closed configuration, the attachable armrest 100 can be easily stored and/or carried.

Figure 4:
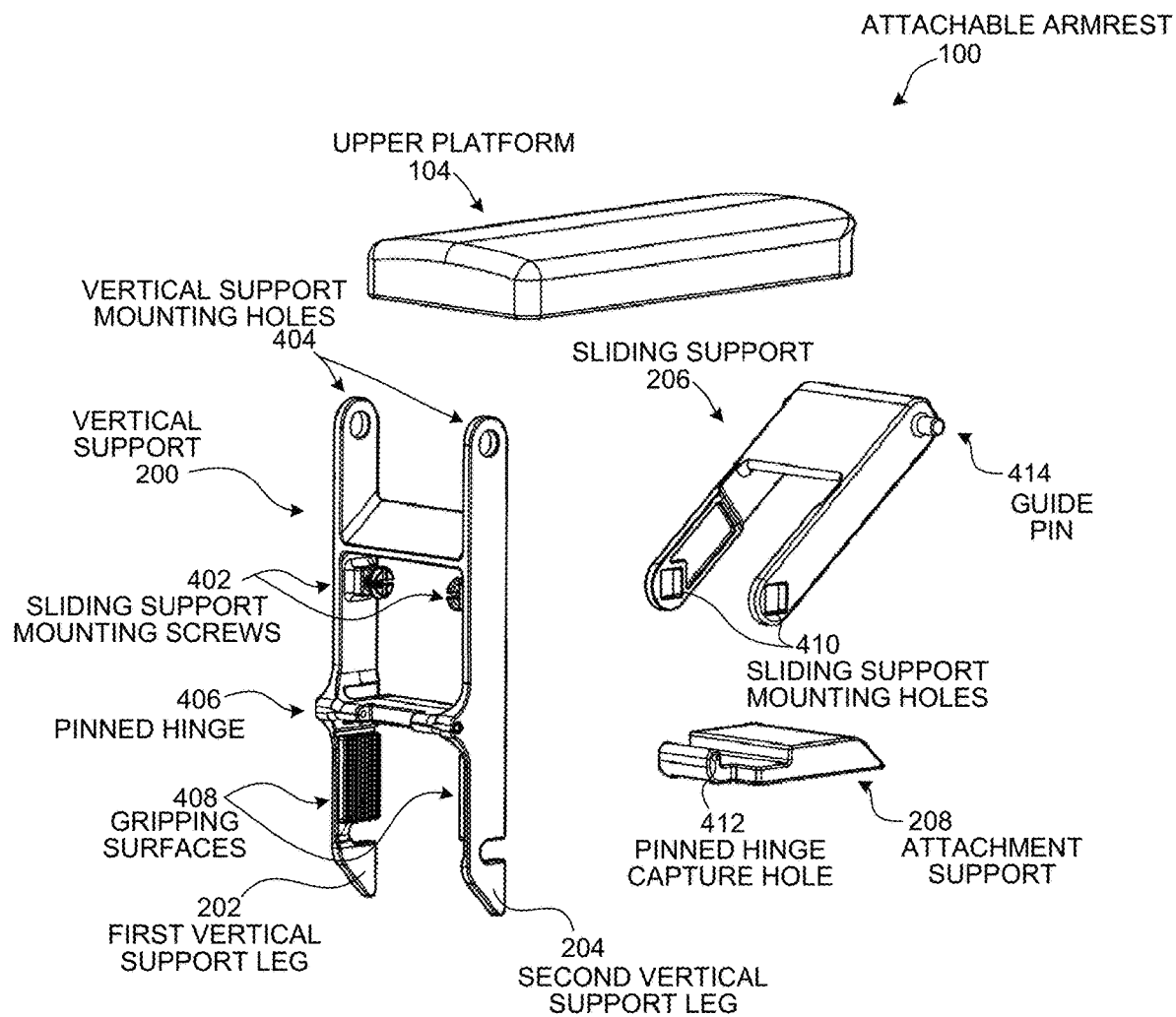
FIG. 4 is a diagram showing an exploded perspective view of an attachable armrest.

FIG. 4 is a diagram showing an exploded perspective view of an attachable armrest 100. In an embodiment, the attachable armrest 100 comprises the vertical support 200, sliding support 206, and attachment support 208. In various exemplary embodiments, the components of the attachable armrest 100 are made from one or more of plastic, metal, or composite materials.

The vertical support 200 includes vertical support mounting holes 404, pinned hinge 406, and gripping surfaces 408 that are located on inside surfaces of the first 202 and second 204 vertical support legs. The gripping surfaces 408 help to secure the attachable armrest 100 to an existing vehicle armrest.

The vertical support mounting holes 404 are used to attach the vertical support 200 to the upper platform 104. The sliding support 206 attaches between the upper platform 104 and the vertical support 200. For example, the sliding support 206 comprises sliding support mounting holes 410 that receive sliding support mounting screws 402 of the vertical support 200. The sliding support 206 also includes a guide pin 414 that slides along the underside of the upper platform 104 to allow the attachable armrest 100 to open and close as illustrated in FIG. 2.

The attachment support 208 comprises a pinned hinge capture hole 412 that captures the pinned hinge 406 and allows the attachment support 208 to rotate in the direction 214. The attachment support 208 provides support along an existing armrest when the attachable armrest 100 is mounted or installed. For example, when the attachable armrest 100 is in the open configuration and installed on a vehicle armrest, the attachment support 208 lies flat along a top surface of the vehicle armrest to provide stability and support to the attachable armrest 100. In another embodiment, the attachable armrest 100 is provided without the attachment support 208. In implementations that omit the attachment support 208, the vertical support 200 provides sufficient stability via the vertical support legs 202 and 204 for stable and reliable use.

Figure 5:
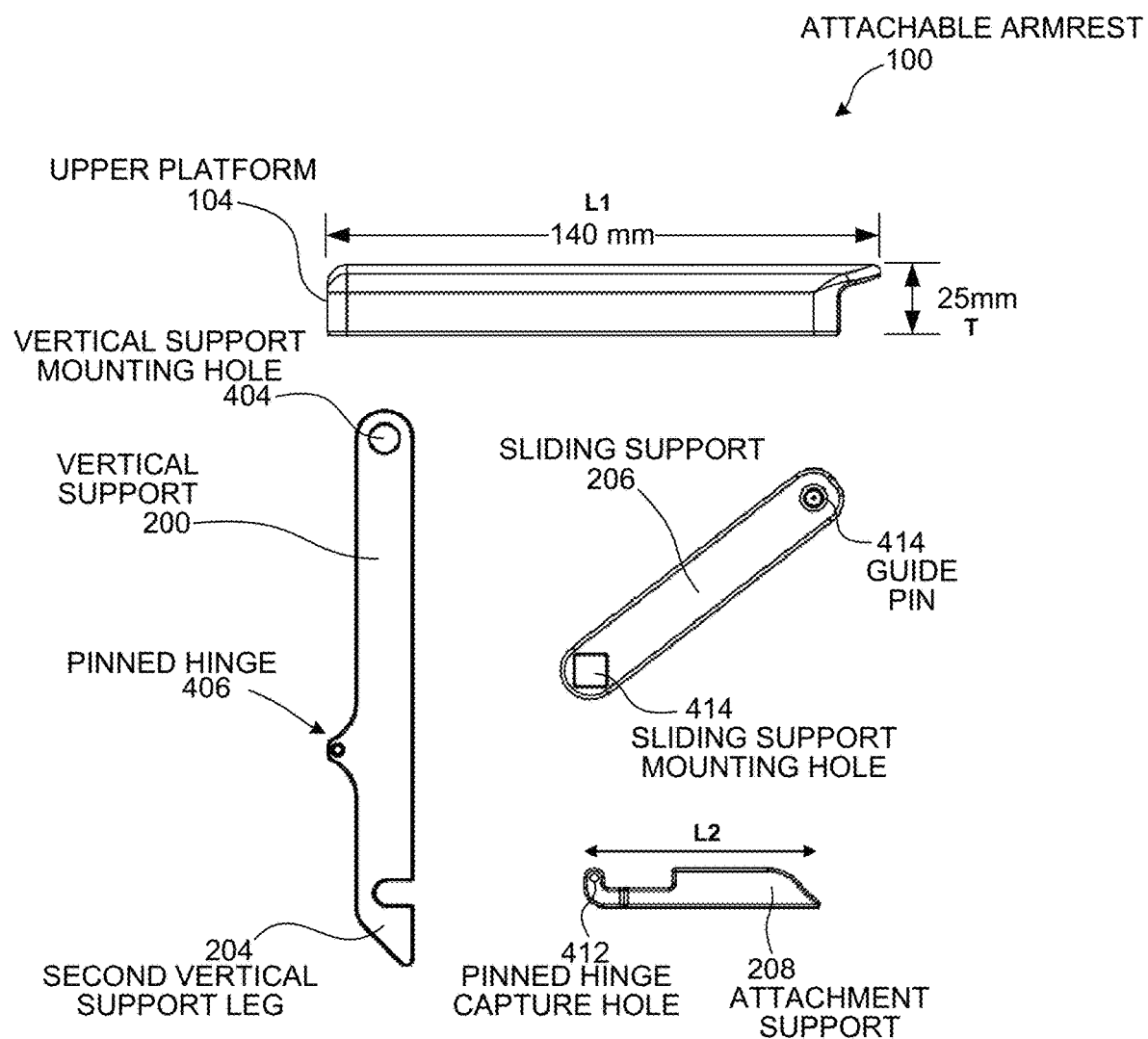
FIG. 5 is a diagram showing an exploded side view of an attachable armrest.

FIG. 5 is a diagram showing an exploded side view of the attachable armrest 100. As illustrated in FIG. 5, the attachable armrest 100 comprises four main components, namely: the upper platform 104; the vertical support 200; the sliding support 206; and the attachment support 208. As illustrated in FIG. 5, the upper platform 104 has a length (L1) of approximately 140 millimeters (140 mm) and a thickness (T) of approximately 25 mm.

Figure 6:
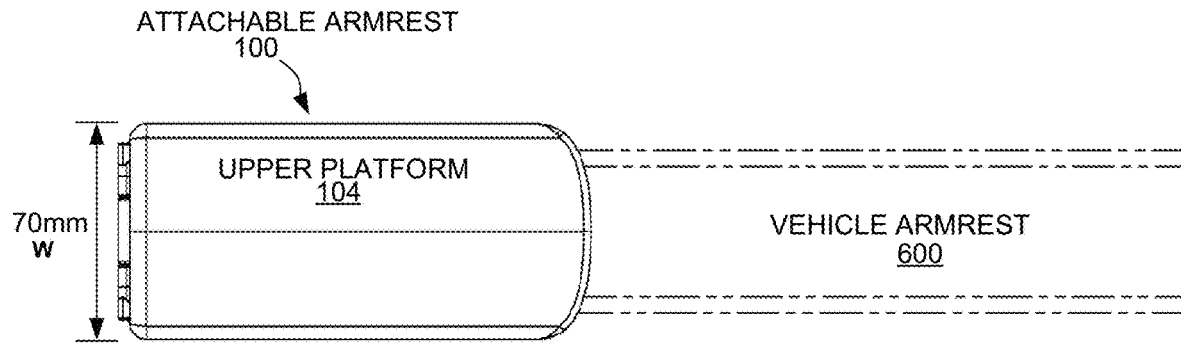
FIG. 6 is a diagram showing a top view of an attachable armrest mounted to an existing vehicle armrest.

FIG. 6 is a diagram showing a top view of the attachable armrest 100 mounted to an existing vehicle armrest 600. As will be shown in further detail below, the vertical support legs (202, 204) are positioned on either side of the existing armrest 600 when the attachable armrest 100 is installed onto the vehicle armrest 600. As illustrated in FIG. 6, the upper platform 104 has a width (W) of approximately 70 mm.

In accordance with at least one novel aspect, the attachable armrest 100 has various components with dimensions that provide for compact storage of the attachable armrest 100. The attachable armrest 100 has a thin, rectangular form factor. In one embodiment, the width W of the upper platform 104 is less than three-fifths of the length L1. The length L1 of the upper platform 104 is more than four times the thickness T of the upper platform 104. In another embodiment, the length L1 of the upper platform 104 is more than five times the thickness T of the upper platform 104. The attachment support 208 has a length L2 that is less than half of the length L1 of the upper platform 104. In another embodiment, the attachment support 208 has a length L2 that is less than two-fifths of the length L1 of the upper platform 104. The above dimensions provide for optimal usability while also ensuring that the size of the attachable armrest 100 in the compact, folded state is not overly burdensome, heavy, or difficult to store and remains convenient for passengers to carry during travel. The above dimensions also ensure that the attachable armrest 100 is attachable to standard commercial aircraft armrests while also providing adequate arm support without interfering with other passengers. It is understood that the above dimensions set forth but a few possible examples and that other dimensions may be employed.

Figure 7:
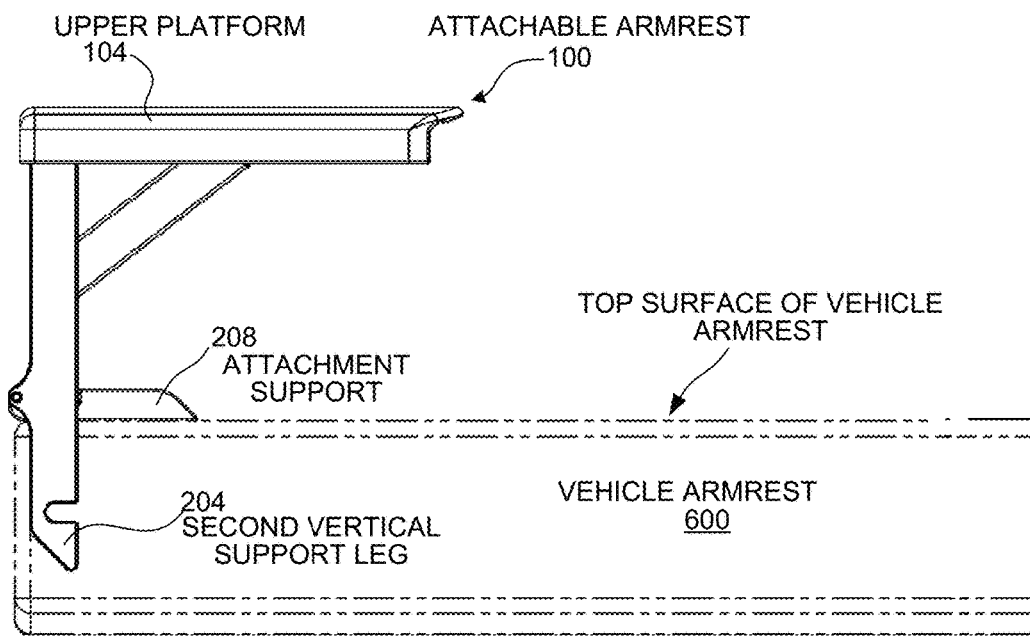
FIG. 7 is a diagram showing a side view of an attachable armrest mounted to an existing vehicle armrest.

FIG. 7 is a diagram showing a side view of the attachable armrest 100 mounted to an existing vehicle armrest 600. As illustrated in FIG. 7, when the attachable armrest 100 is installed, the vertical support legs (202, 204) are positioned on either side of the vehicle armrest 600 to straddle the vehicle armrest 600. In this position, the attachment support 208 lies flat against a top surface of the existing vehicle armrest 600 to provide support and stability.

As illustrated in FIG. 7, when the attachable armrest 100 is installed on the existing vehicle armrest 600, the upper platform 104 provides an additional armrest that is substantially parallel to the existing armrest 600 and onto which a first passenger can rest their arm. The existing armrest 600 can be utilized by a second passenger to rest their arm. Thus, the upper platform and the vehicle armrest can be used simultaneously by different passengers seated in adjacent seats.

Figure 8:
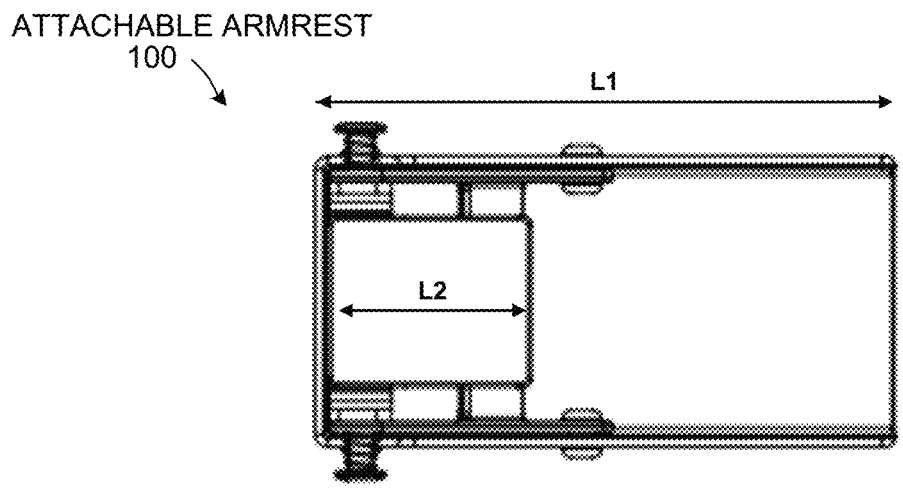
FIG. 8 is a diagram showing a bottom view of an attachable armrest.

FIG. 8 is a diagram showing a bottom view of the attachable armrest 100.

Figure 9:
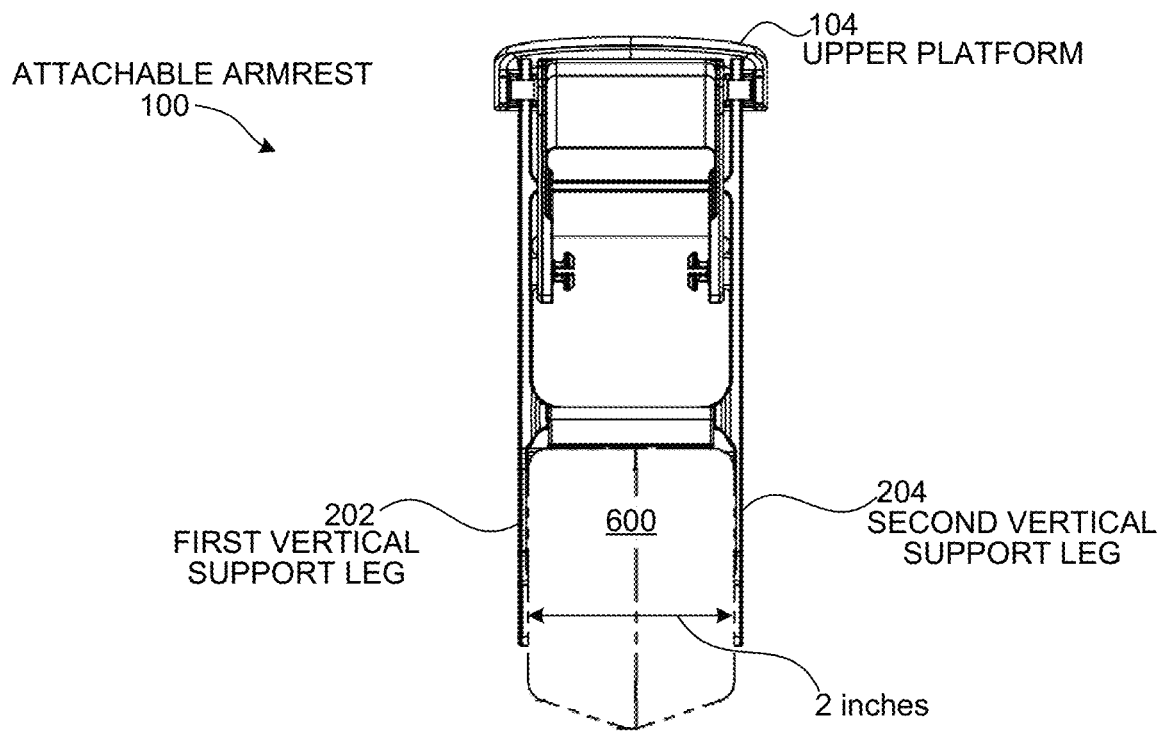
FIG. 9 is a diagram showing an end view of the attachable armrest attached to a vehicle armrest.

FIG. 9 is a diagram showing an end view of the attachable armrest 100 attached to the vehicle armrest 600. As illustrated in FIG. 9, when the attachable armrest is installed, the vertical support legs (202, 204) straddle the existing vehicle armrest 600. As illustrated in FIG. 9, the distance between the vertical support legs (202, 204) is approximately 2 inches.

Figure 10:
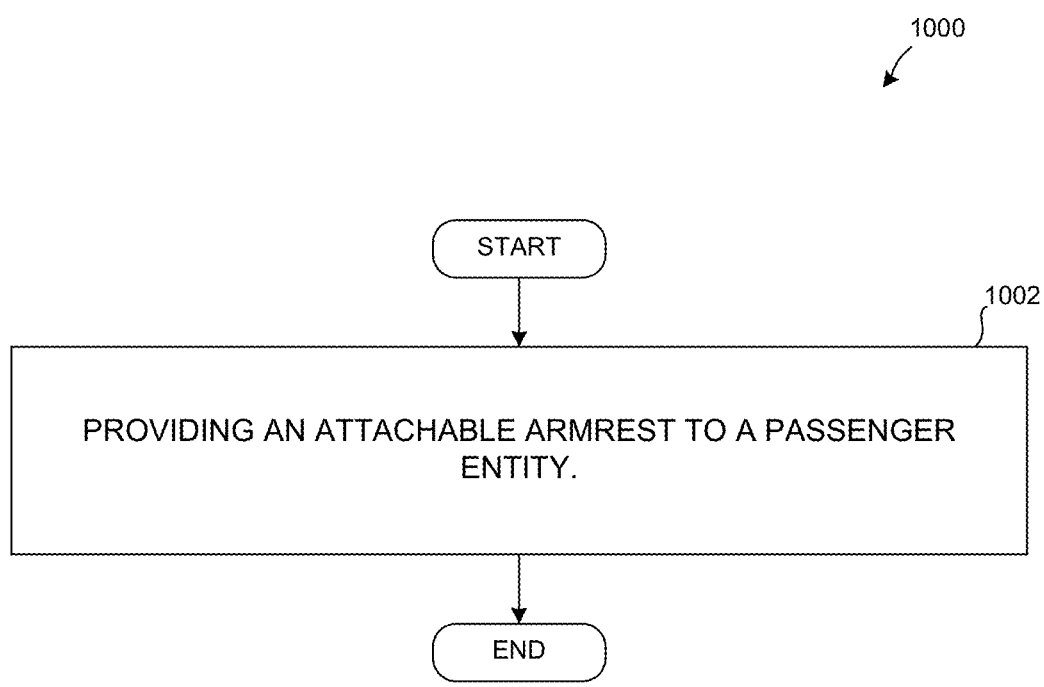
FIG. 10 is a diagram showing a method for providing an attachable armrest.

FIG. 10 is a diagram showing a method 1000 for providing an attachable armrest. At block 1002, the attachable armrest is provided to a passenger.

Figure 11:
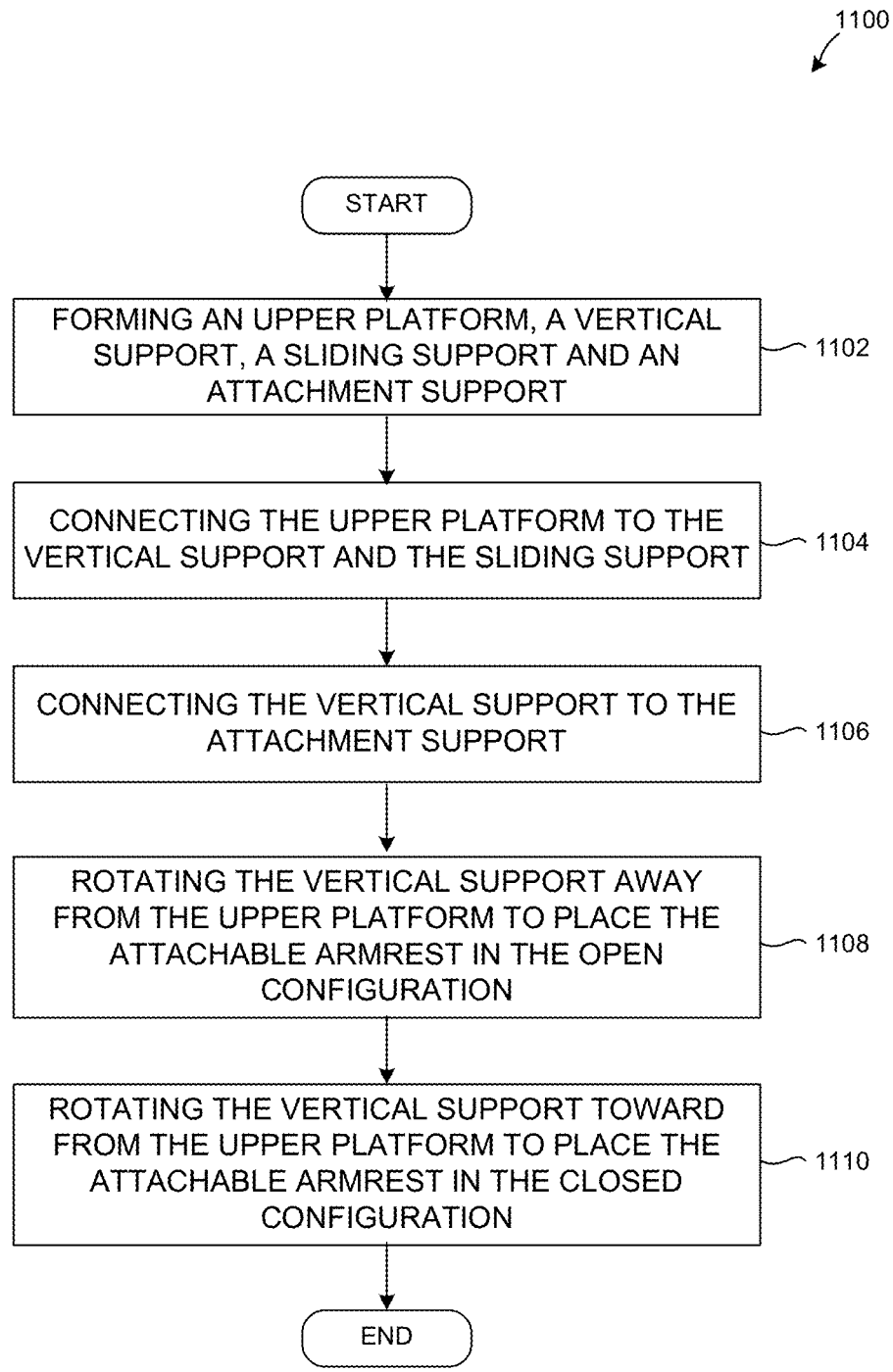
FIG. 11 is a diagram showing a method for forming an attachable armrest.

FIG. 11 is a diagram showing a method 1100 for forming an attachable armrest. For example, the method 1100 is suitable for use to form the attachable armrest 100.

At block 1102, an upper platform 104, vertical support 200, sliding support 206, and attachment support 208 are formed. For example, these components are formed as illustrated in FIG. 4.

At block 1104, the upper platform is connected to the vertical support and the sliding support. For example, the upper platform 104 is connected to the vertical support 200 using the vertical support mounting holes 404. The upper platform 104 is connected to the sliding support 206 using the guide pin 414.

At block 1106, the vertical support is connected to the attachment support. For example, the vertical support 200 is connected to the attachment support 208 by inserting the pinned hinge 406 into the capture hole 412.

At block 1108, the vertical support is rotated away from the upper platform to place the attachable armrest in the open configuration. For example, as illustrated in FIG. 2, the vertical support 200 is rotated along path 210 away from the upper platform 104 to place the attachable armrest 100 in the open configuration.

At block 1110, the vertical support is rotated toward the upper platform to place the attachable armrest in the closed configuration. For example, as illustrated in FIG. 2, the vertical support 200 is rotated along path 210 toward the upper platform 104 to place the attachable armrest 100 in the closed configuration.

Figure 12:
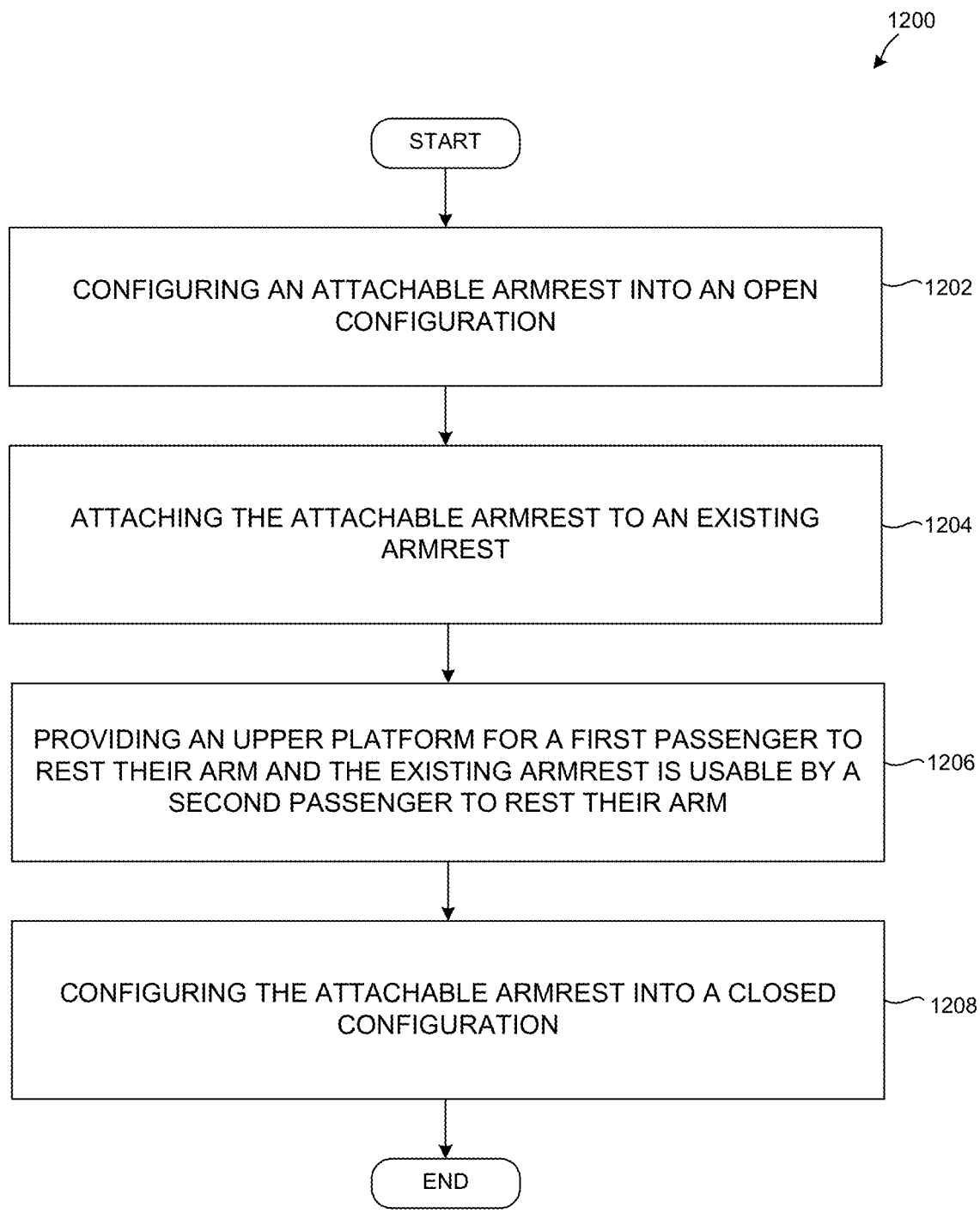
FIG. 12 is a diagram showing a method for using an attachable armrest.

FIG. 12 is a diagram showing a method 1200 for using an attachable armrest. For example, the method 1200 is suitable for use with the armrest 100.

At block 1202, the attachable armrest is placed in an open configuration. For example, as illustrated in FIG. 2, the vertical support 200 is rotated along path 210 away from the upper platform 104 to place the attachable armrest 100 in the open configuration.

At block 1204, the attachable armrest is attached to an existing armrest of a vehicle. For example, as illustrated in FIG. 7, the armrest 100 is attached to the vehicle armrest 600 by positioning the legs (202, 204) to straddle the existing vehicle armrest.

At block 1206, an upper platform is provided for a first passenger to rest their arm and the existing armrest is usable by a second passenger to rest their arm. For example, as illustrated in FIG. 7, when the attachable armrest 100 is attached to the vehicle armrest 600, the upper platform 104 is available for use by the first passenger and the top surface of the vehicle armrest 600 is available for use by the second passenger.

At block 1208, the attachable armrest is placed in the closed configuration for storage and transport. For example, as illustrated in FIG. 2, the vertical support 200 is rotated along path 210 toward the upper platform 104 to place the attachable armrest 100 in the closed configuration.

Figure 13:
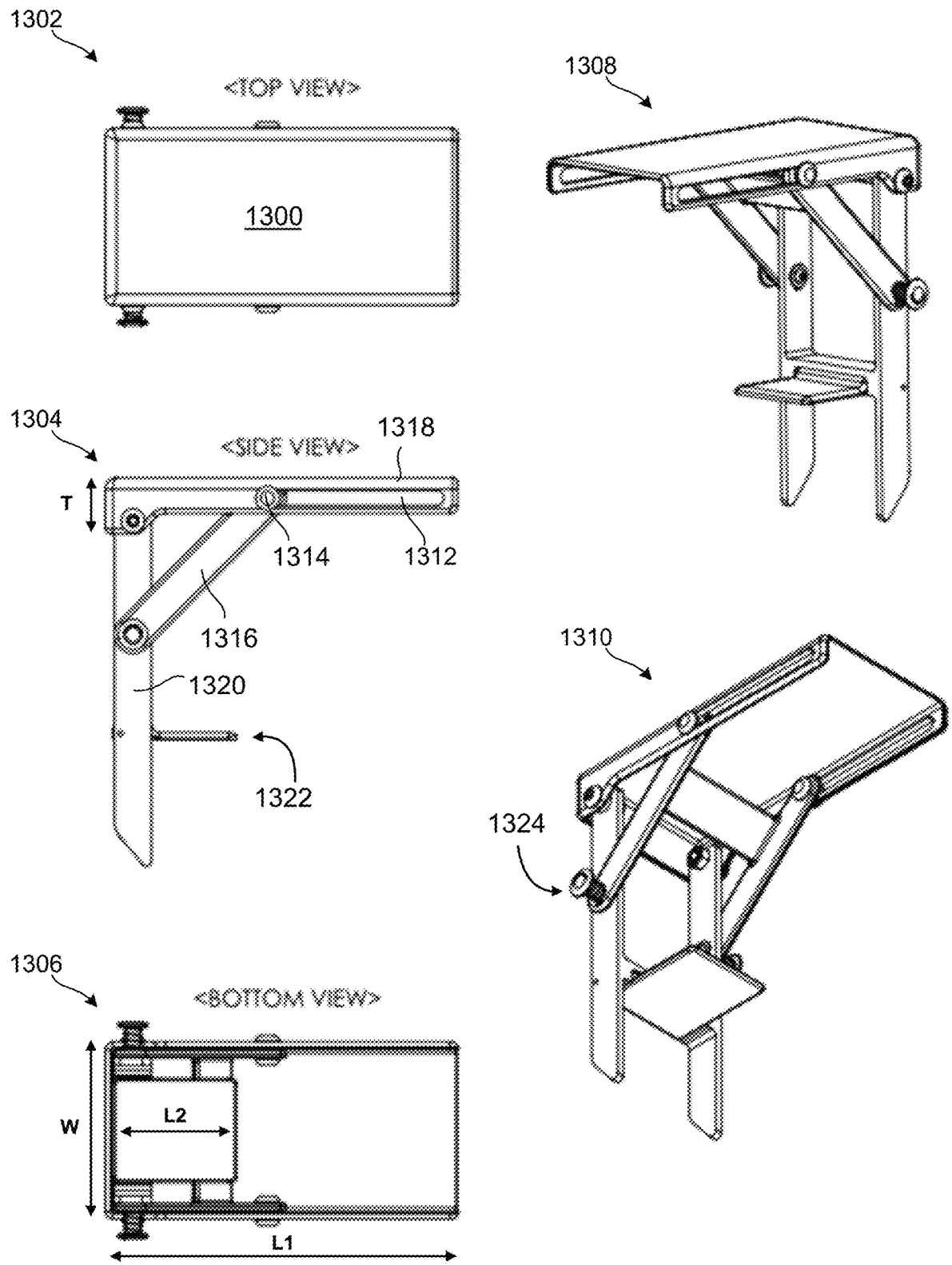
FIG. 13 is a diagram showing additional embodiments of an attachable armrest.

FIG. 13 is a diagram showing additional embodiments of an attachable armrest 1300. The additional embodiments show top view 1302, side view 1304, and bottom view 1306 of the attachable armrest 1300. The side view 1304 illustrates how the guide pin 1314 of the sliding support 1316 is installed in a slot 1312 of the upper platform 1318. As the guide pin 1314 slides along the slot 1312, the platform 1318 and the vertical support 1320 fold together. FIG. 13 also shows a top perspective view 1308 and a bottom perspective view 1310 of the attachable armrest 1300. The attachable armrest 1300 includes a button-activated spring hinge 1324. The button-activated spring hinge 1324 allows attachable armrest 1300 to switch between compact and expanded states.

In accordance with at least one novel aspect, the attachable armrest 1300 has various components with dimensions that provide for compact storage of the attachable armrest 1300. The attachable armrest 1300 has a thin, rectangular form factor. In one embodiment, the width W of the platform 1318 is less than three-fifths of the length L1. The length L1 of the platform 1318 is more than four times the thickness T of the platform 1318. In another embodiment, the length L1 of the platform 1318 is more than five times the thickness T of the upper platform 1318. An attachment support 1322 has a length L2 that is less than half of the length L1 of the platform 1318. In another embodiment, the attachment support 1322 has a length L2 that is less than two-fifths of the length L1 of the platform 1318. The above dimensions provide for optimal usability while also ensuring that the size of the attachable armrest 1300 in the compact, folded state is not overly burdensome, heavy, or difficult to store and remains convenient for passengers to carry during travel. The above dimensions also ensure that the attachable armrest 1300 is attachable to standard commercial aircraft armrests while also providing adequate arm support without interfering with other passengers. It is understood that the above dimensions set forth but a few possible examples and that other dimensions may be employed.

In another embodiment, the attachable armrest 1300 is provided without the attachment support 1322. In implementations that omit the attachment support 1322, the vertical support 200 provides sufficient stability via the vertical support legs that straddle the existing armrest during use. These vertical support legs provide sufficient support to enable stable use of the attachable armrest 1300.

Figure 14:
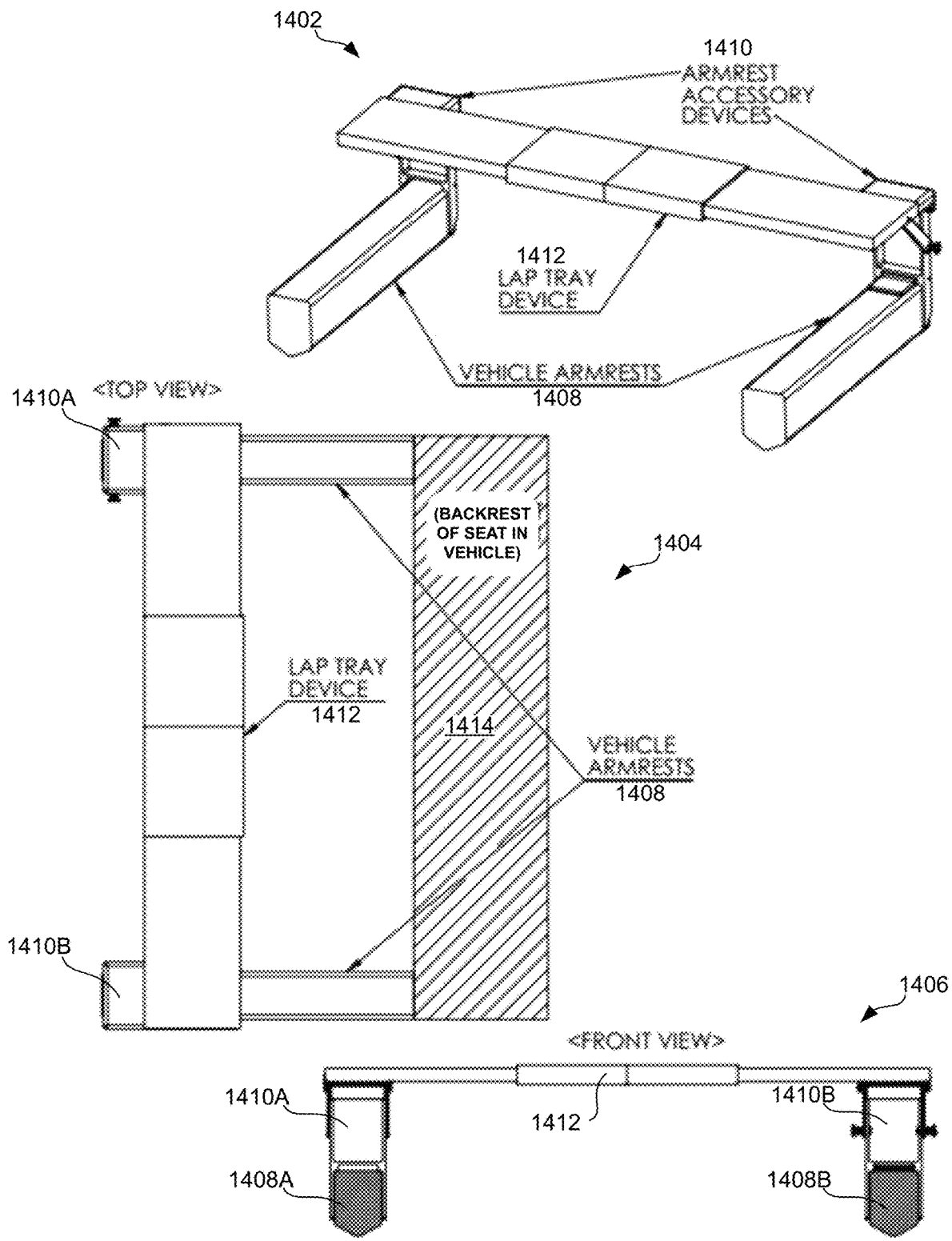
FIG. 14 is a diagram showing an embodiment of a lap tray device for use with an attachable armrest.

FIG. 14 is a diagram showing embodiments of a lap tray device 1412 for use with an attachable armrest. A perspective view 1402 illustrates how two attachable armrests 1410 are attached to two vehicle armrests 1408 of a vehicle seat. The lap tray device 1412 attaches to the attachable armrests 1410 to provide a tray for use by a passenger.

In a top view 1404, a backrest 1414 of a vehicle seat is shown along with the vehicle armrests 1408. The two attachable armrests 1410A and 1410B are attached at the ends of the vehicle armrests 1408. The lap tray device 1412 is attached to the two attachable armrest 1410A-B. It should be noted that when the two attachable armrests 1410A-B are used with the lap tray device 1412, the two armrests are attached to the end of the vehicle armrests and are rotated to face the backrest of the vehicle seat.

A front view 1406, illustrates two attachable armrests 1410A-B that are attached at the ends of the vehicle armrests 1408A-B. The lap tray device 1412 is attached to the attachable armrests 1410A-B.

FIG. 15 is a diagram showing a detailed embodiment of the lap tray device 1412 shown in FIG. 14. A perspective view 1502 illustrates the lap tray device 1412 in an open configuration. A first multi-view 1504 set of drawings illustrates top, front, and bottom views of the lap tray device 1412 in an open configuration when in use. A second multi-view set of drawings 1504 illustrates top, front, and bottom views of the lap tray device 1412 in a closed configuration when stored.

The various embodiments of the novel portable attachable armrest disclosed above provide significant improvements over conventional armrests which typically do not accommodate passengers seated next to each other. For example, existing armrests used in aircraft seats are narrow in width and difficult to share. Conventional devices designed to overcome the problems associated with armrests on commercial vehicles have various limitations, such as being permanently installed and not portable. Some known devices cover a significant portion of the existing armrest, thereby leaving the existing armrest unusable. Other available devices are not portable making them difficult to store and transport. Still other known devices are overly wide, which reduces available seating space.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An attachable armrest comprising:
a vertical support having first and second legs that straddle an armrest of a vehicle;
an upper platform that connects to the vertical support, wherein the upper platform provides an armrest surface that is substantially parallel with a top surface of the armrest of the vehicle, and wherein the armrest surface and the top surface are simultaneously usable as armrests;
an attachment support that connects to the vertical support and contacts the top surface of the armrest of the vehicle; and
a sliding support that connects to the vertical support and the upper platform.

2. The attachable armrest of claim 1, wherein the vertical support comprises:
vertical support mounting holes that are configured to attach the vertical support to the upper platform;
mounting screws that are configured to attach the vertical support to the sliding support; and
a pinned hinge that is configured to attach vertical support to the attachment support.

3. The attachable armrest of claim 2, wherein the upper platform comprises a platform coupling that couples to the vertical support mounting holes.

4. The attachable armrest of claim 2, wherein the sliding support comprises sliding support mounting holes that couple to the mounting screws of the vertical support.

5. The attachable armrest of claim 2, wherein the attachment support comprises a capture hole that couples to the pinned hinge.

6. The attachable armrest of claim 2, wherein the attachment support folds at the pinned hinge to align with the vertical support.

7. The attachable armrest of claim 1, wherein the sliding support comprises a guide pin that is captured by the upper platform.

8. The attachable armrest of claim 7, wherein the vertical support is configured to fold within the upper platform when the attachable armrest is removed from the armrest of the vehicle.

9. The attachable armrest of claim 8, wherein the guide pin of the sliding support slides along the upper platform when the vertical support is folded to the upper platform.

10. The attachable armrest of claim 1, wherein the first and second legs include gripping surfaces that contact the armrest of the vehicle.

11. An attachable armrest comprising:
a vertical support having first and second legs that straddle an armrest of a vehicle;
an upper platform that connects to the vertical support, wherein the upper platform provides an armrest surface that is substantially parallel with a top surface of the armrest of the vehicle, and wherein the armrest surface and the top surface are simultaneously usable as armrests; and
a lap tray device that is configured to connect between two attachable armrests.

12. An apparatus comprising:
a support assembly comprising a vertical support, an attachment support, and a sliding support, wherein the vertical support has first and second legs that straddle an armrest of a vehicle, wherein the attachment support connects to the vertical support and contacts the top surface of the armrest of the vehicle; and
means for providing an armrest surface, wherein the means for providing attaches to the vertical support, wherein the sliding support connects to the vertical support and to the means for providing, wherein the means for providing is parallel with a top surface of the armrest of the vehicle, and wherein the armrest surface and the top surface are simultaneously usable as armrests.

13. The apparatus of claim 12, wherein the means for providing is an upper platform.

14. A portable armrest that attaches to an armrest of a vehicle, the portable armrest comprising:
a lower portion and an upper portion, the lower portion having a length that is no longer than one third of a length of the upper portion;
a vertical support portion interposed between the lower portion and the upper portion, the vertical support portion having at least one leg; and
a sliding support extending from the at least one leg of the vertical support portion, wherein the portable armrest releasably attaches to the armrest at an attachment point which allows use of both the portable armrest and the armrest.

15. A method comprising:
forming a vertical support having first and second legs that are configured to straddle an armrest of a vehicle;
forming an upper platform that connects to the vertical support and provides a surface that is substantially parallel with a top surface of the armrest of the vehicle, and wherein the armrest surface and the top surface are simultaneously usable as armrests;
forming an attachment support that connects to the vertical support and contacts the top surface of the armrest of the vehicle; and
forming a sliding support that connects between the vertical support and the upper platform.

16. The method of claim 15, further comprising:
assembling the vertical support, the upper platform, the attachment support, and the sliding support to form an attachable armrest.

17. The method of claim 15, wherein the sliding support attaches between the upper platform and the vertical support via at least one of a pinned hinge, a button activated spring hinge, or a pin.

18. The method of claim 15, wherein a pin along the sliding support slides along the upper platform when the vertical support is folded into the upper platform.

19. The method of claim 15, wherein the attachment support folds along a hinge to align with the vertical support.

20. The method of claim 15, wherein the forming of the vertical support, the upper platform, and the sliding support involves a manufacturing process taken from the group consisting of: a computer numerical control (CNC) machining process, an injection molding process, and a 3D (three-dimensional) printing process.

* * * * *